United States Patent
Lampkins et al.

(10) Patent No.: US 11,184,166 B2
(45) Date of Patent: Nov. 23, 2021

(54) DISTRIBUTED RANDOMNESS GENERATION VIA MULTI-PARTY COMPUTATION

(71) Applicant: HRL Laboratories, LLC, Malibu, CA (US)

(72) Inventors: Joshua D. Lampkins, Gardena, CA (US); Hyun (Tiffany) J. Kim, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/779,397

(22) Filed: Jan. 31, 2020

(65) Prior Publication Data

US 2020/0266981 A1      Aug. 20, 2020

Related U.S. Application Data

(60) Provisional application No. 62/805,434, filed on Feb. 14, 2019.

(51) Int. Cl.
| | |
|---|---|
| *G06F 21/00* | (2013.01) |
| *H04L 29/06* | (2006.01) |
| *H04L 9/08* | (2006.01) |
| *G06F 21/75* | (2013.01) |
| *H04L 9/32* | (2006.01) |

(52) U.S. Cl.
CPC ............ *H04L 9/0869* (2013.01); *G06F 21/75* (2013.01); *H04L 9/3236* (2013.01); *H04L 2209/046* (2013.01)

(58) Field of Classification Search
CPC ................. H04L 9/0869; H04L 9/3236; H04L 2209/046; H04L 2209/46; H04L 2209/84; H04L 9/00; G06F 21/75; G06F 7/58; Y04S 40/20
See application file for complete search history.

(56) References Cited

U.S. PATENT DOCUMENTS

| | | | |
|---|---|---|---|
| 2012/0002811 A1* | 1/2012 | Smart | ..................... H04L 9/085 380/255 |
| 2018/0314781 A1 | 11/2018 | Charlie et al. | |
| 2020/0153640 A1* | 5/2020 | Ranellucci | ............ H04L 9/3239 |

OTHER PUBLICATIONS

Notification of Transmittal, The International Search Report, and the Written Opinion of the International Searching Authority for PCT/US2020/016277; dated Apr. 21, 2020.

(Continued)

*Primary Examiner* — Lisa C Lewis
(74) *Attorney, Agent, or Firm* — Tope-McKay & Associates

(57) ABSTRACT

Described is a system for jointly generating a random value amongst a set of servers for secure data sharing. The set of servers initiates a randomness generation protocol where each server in the set of servers selects a randomly generated polynomial and broadcasts a cryptographic hash function of the randomly generated polynomial. Each server sends its value of the cryptographic hash function of the randomly generated polynomial to the set of servers. The randomness generation protocol is used in a multi-party computation protocol to ensure a set of data is securely shared electronically amongst the set of servers via a secure, authenticated broadcast channel.

16 Claims, 3 Drawing Sheets

(56) References Cited

OTHER PUBLICATIONS

Baruch Awerbuch et al.: "Robust Random Number Generation for Peer-to-Peer Systems", Jan. 1, 2006 (Jan. 1, 2006), Principles of Distributed Systems Lecture Notes in Computer Science;;LNCS, Springer, Berlin, DE, pp. 275-289, XP019052525, ISBN: 978-3-540-49990-9, abstract, Chapter 1. "Introduction"; pp. 275-280, Chapter 2. "Robust Random Number Generation"; pp. 280-285.

Mahmood Zahid et al: "Distributed Multiparty Key Management for Efficient Authentication in the Internet of Things", IEEE Access, vol. 6, May 24, 2018 (May 24, 2018), p. 29460-29473, XP011685603, DOI: 10. 1109/ACCESS .2018. 2840131 [retrieved on Jun. 15, 2018] abstract, Chapter I. "Introduction"; p. 29460-p. 29461 Chapter IV. "Distributed Multiparty Key (DMK) Establishment Scheme"; p. 29464-p. 29467.

FIPS PUB 180-4, Federal Information Processing Standards Publication, Secure Hash Standard (SHS), https://nvlpubs.nist.gov/nistpubs/FIPS/NIST.FIPS.180-4.pdf, pp. 1-31, Aug. 2015.

Matthias Fitzi, Juan A. Garay, Shyamnath Gollakota, C. Pandu Rangan, and K. Srinathan. Round-optimal and efficient verifiable secret sharing. In Theory of Cryptography, Third Theory of Cryptography Conference, TCC 2006, vol. 3876 of Lecture Notes in Computer Science, pp. 329-342. Springer, 2006.

\* cited by examiner

DISTRIBUTED RANDOMNESS GENERATION VIA MULTI-PARTY COMPUTATION

CROSS-REFERENCE TO RELATED APPLICATIONS

This is a Non-Provisional Application of U.S. Provisional Application No. 62/805,434, filed in the United States on Feb. 14, 2019, entitled, "Distributed Randomness Generation via Multi-Party Computation," the entirety of which is incorporated herein by reference.

BACKGROUND OF INVENTION

(1) Field of Invention

The present invention relates to a system for distributed generation of a random value among a collection of servers, and more particularly, to a system for distributed generation of a random value among a collection of servers via multi-party computation.

(2) Description of Related Art

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol.

Fitzi et al. described weak verifiable secret sharing protocols in "Round-optimal and efficient verifiable secret sharing," In Theory of Cryptography, Third Theory of Cryptography Conference, volume 3876 of Lecture Notes in Computer Science, pages 329-342, 2006, which is hereby incorporated by reference as though fully set forth herein. Using the weak verifiable secret sharing protocols from Fitzi et al., one can construct a randomness generation protocol. However, in the case that there are no corruptions and the servers have access to a broadcast channel, the resulting protocol would have a communication complexity of $O(n^3)$ field elements.

A continuing need exists for a randomness generation protocol having a lower communication complexity than previous protocols.

SUMMARY OF INVENTION

The present invention relates to a system for distributed generation of a random value among a collection of servers, and more particularly, to a system for distributed generation of a random value among a collection of servers via multi-party computation. The system comprises one or more processors and a non-transitory computer-readable medium having executable instructions encoded thereon such that when executed, the one or more processors perform multiple operations. The system initiates a randomness generation protocol for distributed generation of a random value amongst the set of servers. Each server selects a randomly generated polynomial, broadcasts a cryptographic hash function of the randomly generated polynomial, and sends its value of the cryptographic hash function of the randomly generated polynomial to the set of servers. The system uses the randomness generation protocol in a multi-party computation protocol to ensure a set of data is securely shared electronically amongst the set of servers via a secure, authenticated broadcast channel.

In another aspect, the system labels any corrupted servers, and quarantines the labeled corrupted servers from the multi-party computation protocol.

In another aspect, when there are no corrupted servers, then the randomness generation protocol has a communication complexity of $O(n^2)$.

In another aspect, the randomness generation protocol is guaranteed to be secure if less than one half of the servers in the set of servers are corrupted.

In another aspect, the set of data comprises diagnostic data from at least one vehicle.

In another aspect, the set of data comprises a cryptographic key.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
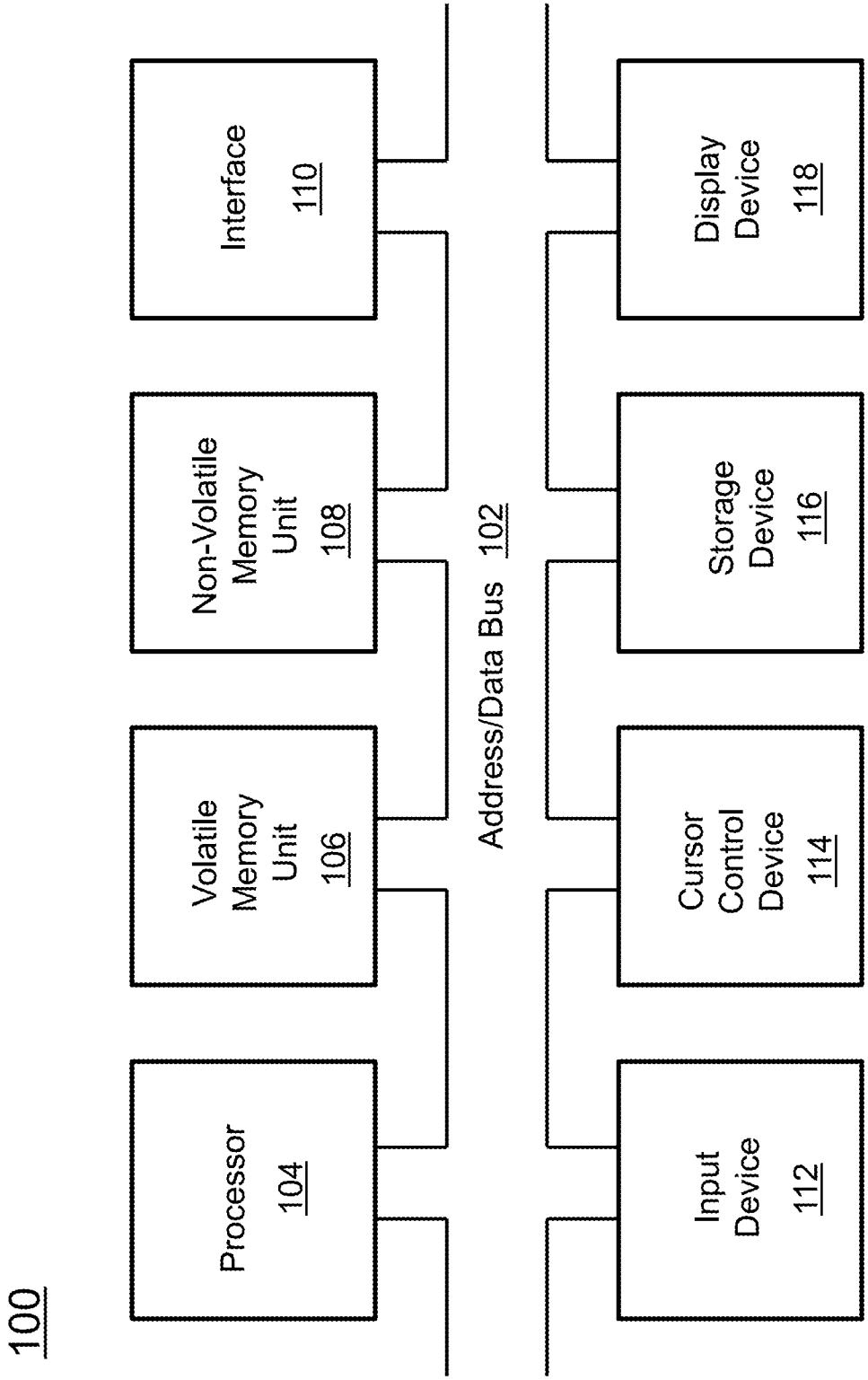
FIG. 1 is a block diagram depicting the components of a system for distributed generation of a random value among a collection of servers according to some embodiments of the present disclosure.

The present invention relates to a system for distributed generation of a random value among a collection of servers, and more particularly, to a system for distributed generation of a random value among a collection of servers via multi-party computation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for distributed generation of a random value among a collection of servers. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
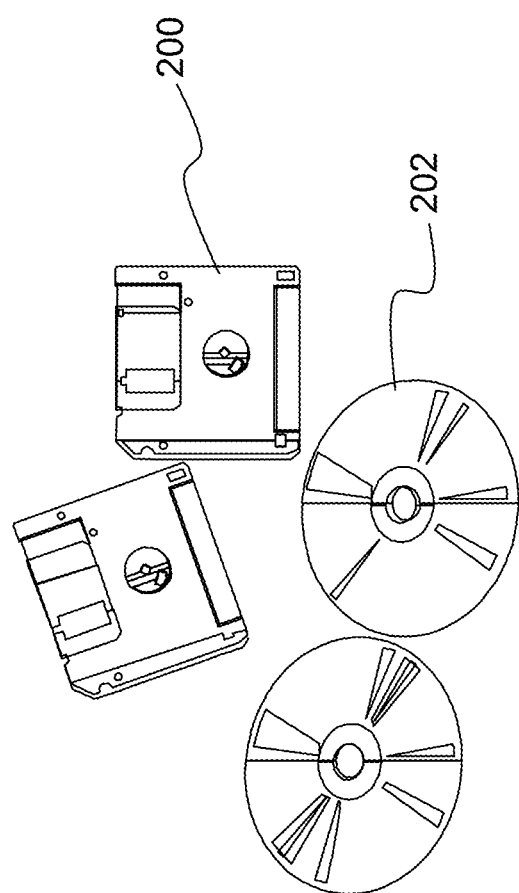
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is a protocol for distributed generation of a random value among a collection of servers. This protocol is used in the context of a multi-party computation (MPC) protocol. A MPC protocol allows a collection of servers to provide input to an arithmetic circuit and to compute the output of the circuit without any individual server knowing the values of intermediate "wires" in the circuit. Only the intended recipients (which may or may not be MPC servers) see the output of the protocol.

When constructing a MPC protocol, it is assumed that some of the MPC servers may be corrupted, meaning that they may reveal secret data to an adversarial entity or deviate from the protocol specification. In practice, MPC server corruption could be caused by an adversarial entity controlling one of the servers, one of the servers being infected with malware, or one of the servers being unavailable due to a denial-of-service attack, etc. Many MPC protocols require a sub-protocol for generating a random value which is publicly revealed, such that even if some of the MPC servers are corrupted, those corrupt servers cannot affect the statistical distribution of the random value. This disclosure describes such a sub-protocol.

The protocol according to embodiments of the present disclosure executes cryptographic operations whereby MPC servers commit to random values such that they cannot be changed at a later point. In steps (2) and (4) of the protocol below, each server sends data to the other servers that commits it to a random value so that the server cannot change the value later in the protocol. The ability for MPC servers to jointly generate a random value that is not biased in favor of any malicious entity has a wide range of applications in MPC protocols. For instance, a jointly generated random value can be used to ensure that a server has correctly distributed shares of a secret without revealing the secret to any server.

(2.1) Preliminaries

There are n MPC servers $\{P_i\}_{i=1}^n$. A MPC server is corrupted if it is controlled by an adversarial entity, infected with malware, or otherwise not following the protocol specification. Let $t<n/2$ denote the corruption threshold (i.e., the maximum number of servers that can be corrupt while still maintaining the integrity of the system). First, note that a server is labeled corrupt if it is in dispute with $t+1$ or more servers, because the assumption that there are at most t corruptions implies that at least one of the $t+1$ servers is uncorrupted, and an uncorrupted server will not be in dispute with a server unless it is corrupted. Given the above, the number of uncorrupted servers must exceed t, because a server that is in dispute with every honest player must be labeled corrupt, and a server is not labeled corrupt unless it is in dispute with more than t servers. Since the number of uncorrupted servers is n−t, this means that n−t>t, which implies n>2t, or t<n/2. Thus, the protocol is only guaranteed to be secure if less than one half of the servers are corrupt. As a non-limiting example, n may be 7 and t may be 3, meaning that there are a total of 7 servers, and the protocol works even if 3 of the servers are corrupted.

Let $\mathcal{C}$ denote the set of servers that are labeled corrupt; a server is labeled corrupt when all uncorrupted servers know that that server is corrupt. Two servers are said to be in dispute if one server accuses the other of being corrupted. Let $\mathcal{D}$ denote the set of pairs of servers that are in dispute with one another. Thus, it is assumed that if a server $P_j \in \mathcal{C}$, such that server $P_j$ is labeled corrupt, then $\{P_j, P_i\} \in \mathcal{D}$ for each $P_i$.

All computations occur over some finite field F. The field must have size $|\mathbb{F}|>2n$. Let $\{\alpha_i\}_{i=1}^n$ denote a set of n distinct non-zero elements of $\mathcal{D}$. The value $\alpha_i$ is the evaluation point of the polynomial of server $P_i$ in a secret-sharing polynomial. Let H be a cryptographic hash function, assumed to be one-way. As an example, SHA-256 may be used as a cryptographic hash function for this protocol. SHA-256 is described in FIPS PUB 180-4, Federal Information Processing Standards Publication, Secure Hash Standard (SHS), which is hereby incorporated by reference as though fully set forth herein. It is assumed that the output of H is an element of $\mathbb{F}$, or at least that it can be encoded as an element of $\mathbb{F}$. The field $\mathbb{F}$, the set $\{\alpha_i\}_{i=1}^n$, and the hash function H are all known to each MPC server. Let $\|$ denote concatenation.

(2.2) Protocol Specification

The following steps are executed by each server $P_i$:

1. Select a polynomial $f_i$ of degree at most t that is random and subject to the constraint that $f_i(\alpha_j)=0$ for each j such that servers $\{P_i, P_j\} \in \mathcal{D}$.
2. Define $c_i$ by the equation $c_i=H(f_i(\alpha_1)\| \ldots \|f_i(\alpha_n))$ and broadcast $c_i$ to the other servers, where $c_i$ is a cryptographic hash function of server $P_i$'s randomly generated polynomial.
3. Receive, from each server $P_j$, each broadcasted cryptographic hash value $c_j$ broadcast by each server $P_j$, where $c_j$ is the cryptographic hash function of each server $P_j$'s randomly generated polynomial.
4. If a server is labeled corrupt, then it is in dispute with each server. Thus, the set of corrupt servers is a subset of the set of servers in dispute with each server $P_i$. In step 16 below, the values received in this step will be checked to see if a server is corrupt, and all uncorrupted servers need to agree on which servers are labeled corrupt. Thus, each server needs to remember the values broadcast in this step, whether or not they are in dispute with that server.

5. Sending the value $f_i(\alpha_j)$ (value of the randomly generated polynomial) to each server $P_j$. The value will only be zero for those servers $P_j$ that are in dispute with server $P_i$.
6. Receive the value $v_j^{(i)}$ (sent in the previous step) from each server $P_j$. If every server is behaving correctly and is not corrupt, then $v_j^{(i)}$ is equal to $f_j(\alpha_i)$.
7. Compute $v^{(i)} = \Sigma_{P_j \notin \mathcal{C}} v_j^{(i)}$, which represents the sum over all servers that are not labeled as corrupt.
8. Broadcast $v^{(i)}$ (the sum of values) to all servers.
9. Receive the value $v^{(j)}$ broadcast by each server $P_j \notin \mathcal{C}$. In other words, the value $v^{(j)}$ is received from each server that is not labeled as corrupt.
10. Interpolate the values $v^{(i)}$ received in the previous step to compute the polynomial f satisfying $f(\alpha_j) = v^{(j)}$ for each server $P_j \notin \mathcal{C}$.
11. If f has degree at most t, then take f(0) as the output of the protocol and terminate. If all servers are behaving correctly, then f is the sum of all the $f_i$'s. The output is the jointly generated random value. In other words, if the interpolated polynomial has degree no more than the corruption threshold, take the evaluation of the polynomial at zero to be the output of the randomness generation protocol (namely the jointly generated random value).
12. If the protocol was not terminated, broadcast each $v_j^{(i)}$ received from each server $P_j \notin \mathcal{C}$ in step 5.
13. Receive each value $v_j^{(k)}$ from each $P_k \notin \mathcal{C}$ for each $P_j \notin \mathcal{C}$.
14. If any server $P_k \notin \mathcal{C}$ broadcast values $v_j^{(k)}$ such that $\Sigma_{P_j \notin \mathcal{C}} v_j^{(k)}$ does not equal the value broadcast in step 7, then this server is labeled corrupt and all servers return to step 1. In other words, determine if any server not labeled corrupt broadcast values that do not add up to the previously broadcast sum of values, and if so, label this server as corrupt and re-run the randomness generation protocol. Since the data being checked is transmitted over a broadcast channel, all uncorrupted servers arrive at the same conclusion.
15. Broadcast $f_i(\alpha_j)$ for each j=1, ..., n. In other words, broadcast all values of each server's own randomly generated polynomial that lie on other servers' polynomial evaluation points.
16. If any server $P_k \notin \mathcal{C}$ broadcast values $f_k(\alpha_j)$ in the previous step that do not lie on a polynomial of degree at most t with $f_k(\alpha_j)=0$ for each $P_j$ in dispute with $P_k$, then $P_k$ is added to $\mathcal{C}$ and all servers return to step 1. In other words, determine if any server not labeled as corrupt broadcast values of its own polynomial that do not lie on a polynomial of degree no more than the corruption threshold with a value of zero for each at the evaluation point of each server that is labeled as being in dispute with the broadcasting server, and if so, label the broadcasting server as corrupt and re-run the randomness generation protocol.
17. If any server $P_k \notin \mathcal{C}$ broadcast values in step 14 that do not correspond to the hash value broadcast in step 2, then $P_k$ is labeled corrupt and all servers return to step 1. In other words, determine if any server not labeled as corrupt broadcast its values of its own polynomial such that when those values of its own polynomial are used as input to the hash function, the output of the hash function is different than the hash output previously broadcast by that server, and if so, label the broadcasting server as corrupt and re-run the randomness generation protocol.
18. If for any given pair of servers $\{P_j, P_k\} \notin \mathcal{D}$, if the value $v_k^{(j)}$ broadcast in step 11 does not equal the value $f_k(\alpha_j)$ broadcast in step 14, then $\{P_j, P_k\}$ is added to $\mathcal{D}$. If this results in some server being in dispute with more than t servers, then this server is added to $\mathcal{C}$. In other words, determine if there is any pair of servers that are not labeled as being in dispute with one another such that one server broadcast a value of its own polynomial that does not equal the corresponding value broadcast by the other server, and if so, label these two servers as being in dispute with one another. If this results in some server being labeled as being in dispute with a number of servers more than the corruption threshold, then label this server as corrupt.
19. Go to step 1. In other words, re-run the randomness generation protocol.

Figure 3:
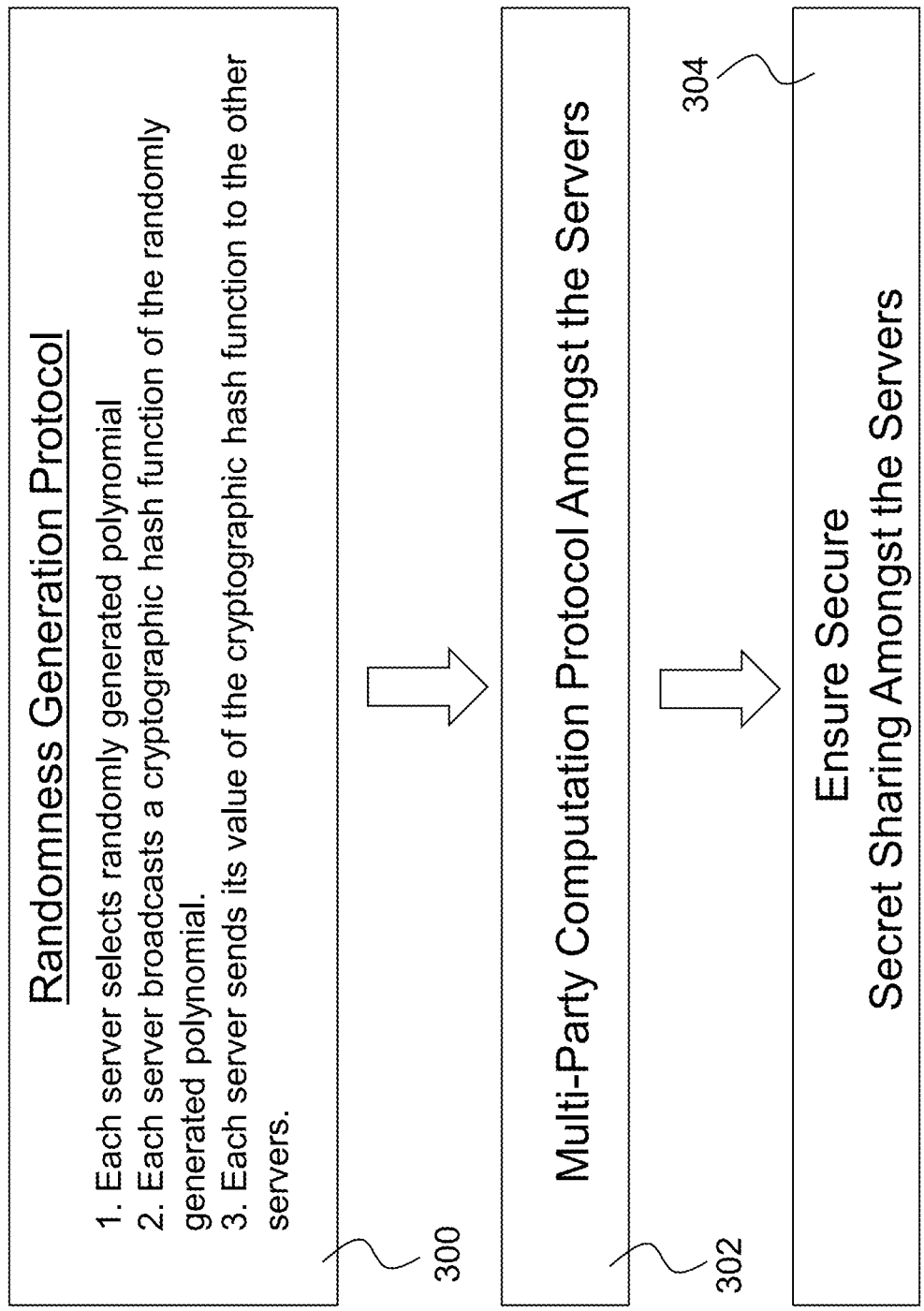
FIG. 3 is a flow diagram illustrating distributed generation of a random value among a collection of servers according to some embodiments of the present disclosure.

After execution of the above steps, each uncorrupted server knows the value of a randomly generated value, which is known by all the uncorrupted servers. The randomly generated value can be used to enable secure sharing of secret data amongst the uncorrupted servers, where the secret data is transmitted electronically via a secure, authenticated broadcast channel. FIG. 3 is a flow diagram illustrating distributed generation of a random value among a collection of servers as described herein. In the randomness generation protocol described herein (element 300), each server selects a randomly generated polynomial, broadcasts a cryptographic hash function of its randomly generated polynomial to the other servers, and sends its value of the cryptographic hash function of the randomly generated polynomial to the other servers, as described in detail above. The uncorrupted servers perform a MPC protocol (element 302) on the jointly generated random value, and the jointly generated random value is used to ensure secure secret sharing amongst the servers (element 304).

(2.3) Identifying and Quarantining Corrupt MPC Servers

There are multiple places in the above protocol where a server may be labeled corrupt. Specifically, this may occur in steps 13, 15, 16, and 17. The reasoning that enables the servers to determine when another server is corrupt is given below.

In step 13, the equation $v^{(k)} = \Sigma_{P_j \notin \mathcal{C}} v_j^{(k)}$ will hold for any server $P_k$ that correctly performed steps 6 and 7, so any server for which this equation does not hold must be corrupt. In step 15, the values $f_k(\alpha_j)$ will lie on a polynomial of degree at most t with $f_k(\alpha_j)=0$ for each $P_j$ in dispute with $P_k$ for any server $P_k$ that correctly performed steps 1 and 14, so if the values $f_k(\alpha_j)$ are not so, then $P_k$ must be corrupt. In step 16, for any server that correctly performed steps 1 and 2, the hash of values broadcast in step 14 will equal the value broadcast in step 2, so any server for which this does not hold must be corrupt. In step 17, if one server broadcast a value in step 11 that does not equal the corresponding value broadcast in step 14, then one of them is lying about what was sent and received in steps 4 and 5, which is why the pair is labeled as disputed. Since the protocol assumes that no more than t servers are corrupt, if a server is in dispute with more than t servers, then it cannot be the case that all the other nodes are corrupt, and so any server in dispute with more than t servers is corrupt.

Labeling servers as corrupt allows the non-corrupt servers to effectively quarantine that server for the rest of the protocol. This means that input from servers labeled corrupt is ignored and not used to produce the final output of the protocol.

Below is an analysis of the communication complexity of the protocol described herein. If there are no corrupt servers, then the protocol will end at Step 10. There are only three steps before Step 10 in which data is sent, and each of those steps is individually analyzed below.

Step 2: Each server broadcasts a hash. Each hash has size $O(1)$, and there are $O(n)$ servers, so the complexity of this step is $O(n)$.

Step 4: Each server sends one field element to each other server, requiring $O(n^2)$ communication.

Step 7: Each server broadcasts a single element, so as with Step 2, the complexity of this step is $O(n)$.

Thus, the total communication when there are no corruptions is $O(n^2)$. As described above, a solution based on the protocols in Fitzi et al. ("Round-Optimal and Efficient Verifiable Secret Sharing," In Theory of Cryptography, Third Theory of Cryptography Conference, TCC 2006, volume 3876 of Lecture Notes in Computer Science, pages 329-342, 2006, which is hereby incorporated by reference as though fully set forth herein) would result in a total communication complexity of $O(n^3)$ when there are no corruptions.

If there are corrupt servers, then the protocol will eventually restart, going back to Step 1. This will cause Steps 2, 4, and 7 to be re-run up to $O(n^2)$ times, which means that in the worst case, the total communication complexity could be up to $O(n^4)$ in the presence of corruptions. Each time the protocol is re-run, either a new dispute is found, or a new a server is labeled corrupt. Since there are n servers, there are at most $O(n^2)$ disputes and $O(n)$ corruptions. Thus, it is re-run at most $O(n^2)$ times.

The randomness generation protocol described in this disclosure can be used in an MPC system, and MPC has a wide range of applications for secure, distributed data storage and computation. For instance, a vehicle (e.g., car, airplane) manufacturer could use this protocol in an MPC system which stores diagnostic data from vehicles/aircraft and performs statistical analysis on that data. As a non-limiting example, the diagnostic data could be GPS data collected from vehicles, and the MPC system could analyze traffic patterns without compromising the privacy of individual drivers. Additionally, this protocol could be used in an MPC system that generates and stores cryptographic keys used for signing and verifying software updates.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for generation of a random value amongst a set of servers, the system comprising:
   a set of servers configured to execute the following operations:
      performing a randomness generation sub-protocol amongst the set of servers for jointly generating a random value,
      wherein the randomness generation sub-protocol comprises:
         selecting, by each server, a randomly generated polynomial;
         broadcasting, by each server, a cryptographic hash value of the server's randomly generated polynomial to the other servers in the set of servers;
         receiving, by each server, the cryptographic hash value broadcast by each other server in the set of servers;
         sending, by each server, a value of its randomly generated polynomial $f_i(\alpha_j)$ to the other servers in the set of servers;
         receiving, by each server, a value of each other server's randomly generated polynomial $v_j^{(i)}$,
         wherein when a server is not labeled as corrupt, then $f_i(\alpha_j)$ is equal to $v_j^{(i)}$;
         computing a sum value over all $v_j^{(i)}$ for all servers not labeled as corrupt;
         broadcasting, by each server that is not labeled as corrupt, the sum value $v^{(j)}$ to all other servers;
         computing, by each server, a polynomial f satisfying $f(\alpha_j)=v^{(j)}$ for each server not labeled as corrupt;
         based on the polynomial f, outputting the jointly generated random value; and
      using the jointly generated random value in a multi-party computation protocol to ensure a set of data is securely shared electronically amongst the set of servers via a secure, authenticated broadcast channel.

2. The system as set forth in claim 1, wherein one or more servers further execute operations of:
   labeling any corrupted servers in the set of servers; and
   quarantining the labeled corrupted servers from the multi-party computation protocol.

3. The system as set forth in claim 2, wherein the system is configured such that when there are no corrupted servers, then the randomness generation sub-protocol has a communication complexity of $O(n^2)$, where n is a number of servers in the set of servers.

4. The system as set forth in claim 2, wherein the system is configured such that the randomness generation sub-protocol is guaranteed to be secure if less than one half of the servers in the set of servers are corrupted.

5. The system as set forth in claim 1, wherein the set of data comprises diagnostic data from at least one vehicle.

6. The system as set forth in claim 1, wherein the set of data comprises a cryptographic key.

7. A computer implemented method for generation of a random value amongst a set of servers, the method comprising acts including:
   performing a randomness generation sub-protocol amongst the set of servers for jointly generating a random value,
   wherein the randomness generation sub-protocol comprises:
      selecting, by each server, a randomly generated polynomial;

broadcasting, by each server, a cryptographic hash value of the server's randomly generated polynomial to the other servers in the set of servers;

receiving, by each server, the cryptographic hash value broadcast by each other server in the set of servers;

sending, by each server, a value of its randomly generated polynomial $f_i(\alpha_j)$ to the other servers in the set of servers;

receiving, by each server, a value of each other server's randomly generated polynomial $v_j^{(i)}$, wherein when a server is not labeled as corrupt, then $f_i(\alpha_j)$ is equal to $v_j^{(i)}$;

computing a sum value over all $v_j^{(i)}$ for all servers not labeled as corrupt;

broadcasting, by each server that is not labeled as corrupt, the sum value $v^{(j)}$ to all other servers;

computing, by each server, a polynomial f satisfying $f(\alpha_j)=v^{(j)}$ for each server not labeled as corrupt;

based on the polynomial f, outputting the jointly generated random value; and using the jointly generated random value in a multi-party computation protocol to ensure a set of data is securely shared electronically amongst the set of servers via a secure, authenticated broadcast channel.

8. The method as set forth in claim 7, wherein one or more servers further execute operations of:

labeling any corrupted servers in the set of servers; and
quarantining the labeled corrupted servers from the multi-party computation protocol.

9. The method as set forth in claim 8, wherein when there are no corrupted servers, then the randomness generation sub-protocol has a communication complexity of $O(n^2)$, where n is a number of servers in the set of servers.

10. The method as set forth in claim 8, wherein the randomness generation sub-protocol is guaranteed to be secure if less than one half of the servers in the set of servers are corrupted.

11. The method as set forth in claim 7, wherein the set of data comprises diagnostic data from at least one vehicle.

12. The method as set forth in claim 7, wherein the set of data comprises a cryptographic key.

13. A non-transitory computer-readable medium for generation of a random value amongst a set of servers, the computer-readable medium having computer-readable instructions stored thereon that are executable by one or more servers for causing the one or more servers to execute the following operations:

performing a randomness generation sub-protocol amongst the set of servers for jointly generating a random value, wherein the randomness generation sub-protocol comprises:

selecting, by each server, a randomly generated polynomial;

broadcasting, by each server, a cryptographic hash value of the server's randomly generated polynomial to the other servers in the set of servers;

receiving, by each server, the cryptographic hash value broadcast by each other server in the set of servers;

sending, by each server, a value of its randomly generated polynomial $f_i(\alpha_j)$ to the other servers in the set of servers;

receiving, by each server, a value of each other server's randomly generated polynomial $v_j^{(i)}$, wherein when a server is not labeled as corrupt, then $f_i(\alpha_j)$ is equal to $v_j^{(i)}$;

computing a sum value over all $v_j^{(i)}$ for all servers not labeled as corrupt;

broadcasting, by each server that is not labeled as corrupt, the sum value $v^{(j)}$ to all other servers;

computing, by each server, a polynomial f satisfying $f(\alpha_j)=v^{(j)}$ for each server not labeled as corrupt;

based on the polynomial f, outputting the jointly generated random value; and using the Jointly generated random value in a multi-party computation protocol to ensure a set of data is securely shared electronically amongst the set of servers via a secure, authenticated broadcast channel.

14. The computer-readable medium as set forth in claim 13, further comprising computer-readable instructions for causing the one or more servers to further execute operations of:

labeling any corrupted servers in the set of servers; and
quarantining the labeled corrupted servers from the multi-party computation protocol.

15. The computer program product as set forth in claim 13, wherein the set of data comprises diagnostic data from at least one vehicle.

16. The computer program product as set forth in claim 13, wherein the set of data comprises a cryptographic key.

* * * * *